United States Patent
Ng

(10) Patent No.: US 6,248,861 B1
(45) Date of Patent: Jun. 19, 2001

(54) MANUFACTURE OF BRANCHED POLYAMIDES

(75) Inventor: Howard Ng, Kingston (CA)

(73) Assignee: DuPont Canada Inc., Mississauga (CA)

( * ) Notice: Subject to any disclaimer, the term of this patent is extended or adjusted under 35 U.S.C. 154(b) by 0 days.

(21) Appl. No.: 09/486,746

(22) PCT Filed: Sep. 13, 1998

(86) PCT No.: PCT/CA98/00843

§ 371 Date: Jun. 1, 2000

§ 102(e) Date: Jun. 1, 2000

(87) PCT Pub. No.: WO99/12993

PCT Pub. Date: Mar. 18, 1999

Related U.S. Application Data

(60) Provisional application No. 60/057,948, filed on Sep. 5, 1997, now abandoned.

(51) Int. Cl.[7] .............................. C08G 69/04; C08G 69/28
(52) U.S. Cl. ........................ 528/310; 528/313; 528/324; 528/329.1; 528/332; 528/335; 528/336; 528/337
(58) Field of Search .................................... 528/310, 313, 528/335, 324, 336, 337, 329.1

(56) References Cited

U.S. PATENT DOCUMENTS

| 4,520,190 | 5/1985 | Coffey et al. | 528/336 |
|---|---|---|---|
| 4,739,035 | 4/1988 | Shyu et al. | 528/335 |
| 4,942,220 | * 7/1990 | Murahashi et al. | 528/313 |
| 5,109,104 | * 4/1992 | Marks | 528/313 |
| 5,596,070 | 1/1997 | Gotz | 528/310 |

FOREIGN PATENT DOCUMENTS

| 0 065 291 A1 | 11/1982 | (EP) | C08G/69/00 |
|---|---|---|---|
| 0 479 306 A2 | 4/1992 | (EP) | C08G/69/00 |
| 0 702 047 A2 | 3/1996 | (EP) | C08G/69/28 |

* cited by examiner

*Primary Examiner*—P. Hampton-Hightower

(57) ABSTRACT

A multi-stage process for the manufacture of branched aliphatic polyamides is provided. The process comprises the steps, in sequence, of feeding to a reactor a slurry of at least one aliphatic dinitrile, and at least one aliphatic diamine, at least one of which is branched, in the presence of 0.05 to 2% by weight of a phosphorous-containing compound, with the incremental addition of water, heating the slurry to a temperature of at least 270° C. while maintaining a pressure of at least 1.2 Mpa, venting water, ammonia and other volatile matter from the reactor while maintaining the temperature and pressure, maintaining the temperature for a further period of time while reducing the pressure to at least atmospheric pressure and then discharging the polyamide so formed. Polyamides made by this process are substantially the same as corresponding polyamides made by the conventional salt-strike process, and can be used in molding, coating and film applications. Examples of polyamides that can be made using this process include those formed from an admixture of adiponitrile and 2-methyl pentamethylene diamine, and from an admixture of 2-methyl glutaronitrile and hexamethylene diamine.

13 Claims, No Drawings

MANUFACTURE OF BRANCHED POLYAMIDES

This application is a 371 of PCT/CA98/00843, filed Sep. 13, 1998, which claims benefit of 60/057,948 filed Sep. 5, 1997, now abandoned.

FIELD OF THE INVENTION

The present invention relates to a process for the manufacture of branched polyamides. In particular, the invention relates to a multi-stage process for the manufacture of branched polyamides from dinitrile and diamine reactants.

BACKGROUND OF THE INVENTION

The conventional process for manufacturing polyamides is known as the "salt-strike" process. In this process, aliphatic dicarboxylic acid monomer is admixed with aliphatic diamine monomer in aqueous solution to form a salt. The salt is fed into a reactor in which both temperature and pressure are elevated. With the emission of water and volatile matter, molten polymer is formed and discharged from the reactor.

Alternative routes to the manufacture of polyamides have been developed. For example, processes in which a dinitrile and a diamine are polymerized to form linear polyamide are described in a number of patent references such as U.S. Pat. No. 2,245,129 to Greenwalt, U.S. Pat. No. 3,847,876 to Onsager, U.S. Pat. No. 4,436,895 to Hoffman et al., and U.S. Pat. No. 4,520,190 to Coffey et. al.

More recently, U.S. Pat. No. 4,739,035 to Shyu et al., describes a two-step process for the manufacture of a polyamide from diamine and dinitrile reactants in which the dinitrile is initially reacted with water in the presence of a catalyst at a temperature sufficient to cause substantial hydrolysis of the dinitrile. Subsequently, the diamine is added to the reaction mixture at a temperature sufficient to cause polymerization.

In a further U.S. Patent, U.S. Pat. No. 5,109,104 to Marks, a process for making polyamide is taught in which an omega-aminonitrile is heated with water and an oxygenated phosphorus catalyst at a pressure of between 200–350 psig. Upon reaching a temperature of 200° C.–260° C., water is added continuously, to a total amount of 15–75 grams/100 grams of omega-aminonitrile, and once the temperature is above 240° C., water vapor and ammonia are continuously removed from the reactor. The resultant mixture is then polymerized at a temperature between 240° C.–330° C.

There are, however, disadvantages associated with the processes described above. Firstly, processes in which dinitrile and diamine monomers are reacted tend to yield lower molecular weight polymers due to incomplete hydrolysis of the dinitrile functionality. Moreover, these processes can lead to the formation of organic by-products which causes discoloration of the polymer product. In the manufacture of branched polymers, these problems are accentuated in the polymer product. Alkyl branched monomers are generally more volatile than their linear counterparts and this makes them more prone to by-product formation. As a result, problems of lower molecular and discoloration in the polymer product are enhanced. Accordingly, there is a need for improved methodology, particularly in the manufacture of branched polyamides.

SUMMARY OF THE INVENTION

It has now been found that branched homopolyamides and copolyamides can be formed by combining a dinitrile with a diamine, and optionally combining aliphatic dicarboxylic acids and nitriles and other aliphatic diamines and dinitriles with the dinitrile/diamine mixture, while minimizing the adverse effects of prior methods.

Accordingly, in one aspect the present invention provides a multi-stage process for the manufacture of a branched aliphatic polyamide comprising the steps of:

(a) feeding an admixture of aliphatic dinitrile, aliphatic diamine and water to a reactor, wherein the amount of water is at least the stoichiometric amount required for conversion of dinitrile and diamine to polyamide and wherein at least one of said dinitrile and said diamine are branched;

(b) heating the admixture in the reactor to a temperature of at least about 270° C. under a pressure of at least about 1.2 MPa in the presence of a catalyst with the incremental addition of water;

(c) venting water ammonia and other volatile matter from the reactor while maintaining said temperature and pressure for a period of time of at least about 30 minutes;

(d) maintaining said temperature for a further period of time while reducing the pressure in the reactor to atmospheric pressure; and (e) discharging the polyamide so obtained from the reactor.

The present process advantageously provides a one-pot, multi-stage polycondensation process for the manufacture of branched polyamides. The incremental addition of water and the continuous removal of water and ammonia from the reaction mixture during the elevated temperature stage of the reaction minimizes discoloration of the polyamide product. Moreover, the reaction is conducted under relatively low pressure, which also allows effective purging of undesirable by-products such as ammonia. The effective purging of ammonia speeds the rate of hydrolysis of the dinitrile reactant thereby minimizing the loss of volatile branched reactant monomers. In this way, the dinitrile and diamine reactants are approximately maintained in stoichiometric ratio resulting in a polyamide product of good molecular weight.

DETAILED DESCRIPTION OF THE INVENTION

The present invention relates to a multi-stage process for manufacturing branched polyamide from a dinitrile and a diamine in which at least one of the dinitrile and diamine is branched.

There is no particular requirement with regard to dinitriles that are suitable for use in the present process of making branched polyamides, with the exception that at least one of the dinitrile and the diamine is branched. In the event that the dinitrile used is to be branched, examples of suitable branched dinitriles include, but are not limited to, 2-methyl glutaronitrile, 3-methyl glutaronitrile, n-methyl 1,4-dicyanobutane where n is 1 or 2 n-methyl 1,5-dicyanopentane where n is 1, 2 or 3, n-methyl dicyanohexane where n is 1, 2 or 3, and n-methyl 1,10 dicyanodecane where n is 1–5. Other branched dinitriles can also be used in the present method, and particularly dinitriles comprising alkyl branches of from 1–3 carbon atoms, i.e. methyl-, ethyl- and propyl- branches. Examples of suitable unbranched dinitriles include, but are not limited to, adiponitrile, 1,5-dicyanopentane, 1,6-dicyanohexane, 1,7-dicyanoheptane and 1,10-dicyanodecane. Preferred dinitriles in accordance with the present invention, however, have six carbon atoms such as adiponitrile, 2-methyl glutaronitrile and other dinitriles derived from butadiene and hydrogen cyanide (HCN).

Similarly, any diamine can be used in the present process with the exception that it must be a branched diamine when the dinitrile used is not branched. Examples of suitable branched diamines include, but are not limited to 2-methyl pentamethylene diamine, 3-methyl pentamethylene diamine. n-methyl 1,6-hexamethylene diamine where n is 2 or 3, n-methyl 1,7-heptamethylene diamine where n is 2–4, n-methyl 1,8-octamethylene diamine where n is 2–4 and n-methyl 1,12-dodecamethylene diamine where n is 2–6. Other branched diamines can also be used in the present method, and particularly diamines comprising alkyl branches of from 1–3 carbon atoms. In the event that a branched diamine is not required, examples of suitable unbranched diamines include, but are not limited to, 1,4-diaminobutane, 1,5-diaminopentane, 1,6-hexamethylene diamine, 1,7-heptamethylene diamine. 1,8-octamethylene diamine and 1,12-dodecamethylene diamine. Preferred diamines in accordance with the present invention have six carbon atoms such as 2-methyl pentamethylene diamine, hexamethylene diamine and other diamines derived from butadiene and HCN.

The dinitrile and diamine may optionally be admixed with one or more aliphatic dicarboxylic acids; lactams; alpha, omega aminocarboxylic acids; alpha omega amino nitriles; alpha, omega alkylene dinitriles; and/or other aliphatic diamines. Examples of suitable aliphatic dicarboxylic acids that can optionally be combined with the dinitrile and diamine to form a branched polyamide include 1, 6-hexanediol acid (adipic acid), 1, 7-heptanedioic acid (pimelic acid), 1,8-octanedioic acid (suberic acid), 1,9-nonanedioic acid (azelaic acid), 1, 10-decanedioic acid (sebacic acid) and 1, 12-dodecanedioic acid. Caprolactam is an example of a suitable lactam that can optionally be added while an example of a suitable alpha, omega amino nitrile is 6-amino caproic nitrile. An example of a suitable alpha, omega alkylene dinitrile is 1,5-dicyano pentane. Alpha, omega aminocarboxylic acids such as aminocaproic acid, amino octanoic acid, amino decanoic acid, amino undecanoic acid and amino dodecanoic acid are suitable for optional admixture with the diamine and dinitrile, and examples of additional diamines that can be added include 1,6-hexamethylene diamine, 1,8-methylene diamine, 1,10-decamethylene diamine and 1,12-dodecamethylene diamine.

The amounts of dinitrile and diamine used in the present process to make branched polyamide, and the amounts of any of the other compounds that can optionally be added to the reaction mixture, are preferably added in substantially stoichiometric ratios, as will be appreciated by persons skilled in the art. However, non-stoichiometric or excess amounts of one or the other of the reactants may be used depending on the desired characteristics of the polyamide to be made. For example, as is known, diamines tend to be more volatile than carboxylic acids and, thus, it may be desirable to feed a slight excess of diamine to the reactor in order to maintain appropriate ratios in the resulting polyamide.

The reaction mixture must contain at least the stoichiometric amount of water required to convert the dinitrile and diamine monomers to the corresponding polyamide. Preferably, the monomers, together with any polymerization catalyst and other additives, are admixed in the presence of a stoichiometric excess of water.

The present process is conducted in the presence of a catalyst. Preferred catalysts are phosphorous-containing compounds such as phosphinic acid and/or the sodium or potassium salts thereof, hypophosphorous acid, sodium hypophosphite, phosphoric acid and the like. A typical amount of catalyst to be added to the mixture of diamine and dinitrile ranges from about 0.05–2% by weight. Preferably an amount of catalyst of about 0.10–0.20% by weight is added to the mixture.

The polymerization mixture is fed to the reactor, which is substantially of the type used in the polymerization of polyamides, for example a stainless steel autoclave connected with a water injection piston pump for continuous water addition. The mixture is then heated in the reactor (autoclave) under pressure while water is added in an incremental manner. The polymerization temperature should be maintained as low as practical, as use of higher temperatures can lead to discoloration of the resulting polyamide, undesirable branching and other side reactions. Nonetheless, the temperature must be sufficiently high to effect polymerization at a practical rate. In particular, the temperature should be at least about 270° C. and preferably in the range of about 275° C. to 290° C. The actual pressure used will depend in part on the particular polyamide that is to be produced in the process. The pressure is preferably maintained at at least about 1200 kPa (1.2 MPa) and preferably no more than about 2100 kPa (2.1 MPa). More preferably, the pressure is maintained at at least about 1300 kPa, and most preferably at at least about 1900 kPa.

The temperature and pressure in the reactor are maintained for a period of time while water, ammonia and other volatile matter are vented from the reactor. Preferably, the temperature and pressure are maintained for at least a period of 30 minutes during venting of the reactor. More preferably, the temperature and pressure are maintained for a period of at least 60 minutes, and most preferably for a period of time that is greater than 60 minutes.

The temperature is maintained for a further period of time, preferably for a period of at least about 10 minutes, and more preferably for a period of at least about 20 minutes, while the pressure is reduced to atmospheric pressure. In one embodiment, the polyamide is subjected to a "vacuum finishing" step in which the pressure in the reactor is reduced to less than atmospheric pressure, preferably by about 50–60 kPa, by application of a vacuum. This step serves to increase the molecular weight of the resulting polyamide. During pressure reduction, the pressure should be reduced in a manner that minimizes or avoids excessive foaming of the reaction mixture in the reactor. In this regard, anti-foam agents, which include polyethers such as Carbowax™, are preferably added to reduce the amount of foaming.

Following pressure reduction, the polyamide is discharged from the reactor. It will be appreciated that the temperatures, pressures and times used in the polymerization process will have an effect on the properties of the polyamide obtained, and will vary with the reactants used and with the polyamide product to be prepared. However, conditions of excessive temperature, pressure and/or reaction time will cause degradation of the polyamide product leading to poor colour, gellation and molecular weight. On the other hand, insufficient temperature, pressure and/or reaction time will result in incomplete hydrolysis and polycondensation, also leading to a polyamide product of low molecular weight.

The present process yields branched polyamides having a melting point that is substantially equivalent to that achieved using the salt-strike process outlined abode, a process in which a corresponding carboxylic acid is used instead of a dinitrile. In one specific example, the dinitrile, 2-methyl glutaronitrile, when reacted with the diamine, hexamethylene diamine, yields a polyamide having a melting point of 175.2° C. while the polyamide made from 2-methyl glutaric acid, the carboxylic acid corresponding to 2-methyl glutaronitrile, using the salt-strike process has a melting point of 174.2° C.

In one embodiment of the present invention, polyamides produced by the process of the present invention comprise at least one pendant alkyl branch having at least one amide linkage along its backbone. Of course, the polyamides can comprise a number of pendant alkyl branches at any amide linkage along the polymer backbone. In accordance with preferred diamine and dinitrile reactants of the present method, the pendant alkyl branch or branches on the polyamide so formed will comprise from 1 to 3 carbon atoms. Generally such polyamides are semi-crystalline polymers, rather than amorphous polymers. Crystallinity can be determined using a differential scanning calorimeter. Additionally, such polymers will have a heat of fusion of greater than about 17 J/g.

The polyamides of the invention may be blended with stabilizers, flame retardants, smoke depressants, plasticizers, conductive and/or anti-static agents, dyes and pigments, fillers, minerals, toughening and other modifying agents, and any other additives that can be used in polyamide compositions. Such additives are used in amounts conventionally blended with polyamides to yield appropriate polyamide compositions. Examples of inorganic heat stabilizers that may be used include copper (I) halides such as copper bromide and copper iodide and alkali halides such as lithium, sodium and potassium bromides and iodides, which may be used with or without phosphorus compounds such as phosphites, phosphines. phosphates and alkali metal salts of phosphorus acids, e.g. sodium phenyl phosphinate, sodium hypophosphite triaryl- and tris (alkylaryi) phosphines, e.g. tri-n-butyl phosphine, phenyl dimethyl phosphine and triphenyl phosphine. Examples of suitable organic heat stabilizers include hindered phenols and hindered amines, as well as UV stabilizers and phenolic metal deactivators. Talc, calcium fluoride and salts of phosphorus acids, such as sodium phenyl phosphinate are examples of nucleating agents that can be blended with polyamides made by the present process. A wide range of fillers may be used in amounts of about 0.5–200 parts of filler per 100 parts of polyamide. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, powdered polytetrafluoroethylene and the like. Fibres of glass, carbon, boron, aromatics and ceramics can also be used as fillers.

The branched polyamides of the present invention are useful for the same applications as the analogous branched polyamides prepared using the conventional salt-strike process. For example, the present polyamides may be used in the manufacture of thermoplastic, shaped articles by injection molding, blow molding, extrusion and compression molding; in the manufacture of coatings and laminates; in the manufacture of packaging and industrial films; and in the manufacture of other melt processable products such as fibers.

The present invention is exemplified by reference to the following non-limiting examples.

EXAMPLE I

Preparation of a homopolymer of 2-methyl pentamethylene diamine and adiponitrile (D,6 polymer)

A 300 mL reaction vessel equipped with an impeller agitator was charged with 65 g (0.560 moles) of 2-methyl pentamethylene diamine, 60 g (0.556 moles) adiponitrile, 40 mL of water and 1.7 mL of 10% hypophosphorous acid (0.0026 moles). The reactants were flushed and blanketed with nitrogen, and heated to 225° C. with the agitator at 150 rpm. Water injection began at 225° C. at a rate of 30 mL/hr. When the pressure in the reaction vessel reached 1.72 MPa and the temperature reached 275° C., the conditions were maintained constant by partially releasing the pressure for 60 minutes. After this holding period, the water injection was stopped and the pressure vented down to atmosphere at 275° C. over 60 minutes. The rate of agitation was reduced to 5 rpm. The reaction mixture was maintained under a vacuum of 67 kPa at 275° C. for 30 minutes, then was cooled down overnight.

The polymer obtained was a slightly yellow crystalline solid, 117.2 g in yield, and had an inherent viscosity (IV) of 1.28 dL/g, inherent viscosity was measured on a 5.0 g/L solution in sulfuric acid. The polymer had a melting point of 178.9° C. with a heat of fusion of 43.4 J/g, as measured by differential scanning calorimetry (DSC), and a thermal decomposition point under nitrogen of 406.4° C., as measured by thermal gravimetric analysis (TGA). IR analysis indicated that the nitrile conversion (from adiponitrile to adipamide) was virtually complete. Residual nitrile groups on the polymer, if any, were at ppm level.

EXAMPLE II

Preparation of copolymers of 2-methyl pentamethylene diamine, hexamethylene diamine and adiponitrile (66/D,6 polymer)

66/D,6 (5 mole % D,6)

A 300 mL reaction vessel equipped with an impeller agitator was charged with 3.25 g (0.028 moles) of 2-methyl pentamethylene diamine, 60 g (0.556 moles) of adiponitrile, 61.8 g (0.533 moles) hexamethylene diamine, 40 mL of water and 1.7 mL of 10% hypophosphorous acid (0.0026 moles). The polymerization procedure of Example I was used.

The polymer obtained was a white, hard and porous solid, 117.4 g in yield, with a relative viscosity (RV) of 38.8 (relative viscosity was measured in an 8.4% solution in formic acid.) The polymer had a melting point of 258.9° C., with heat of fusion of 50.0 J/g and a thermal decomposition temperature under nitrogen of 413.5° C. No residual nitrile absorption was observed by IR analysis.

66/D,6 (10 mole % D,61)

A copolymer of 66/D,6 containing 10 mole % D,6 was prepared using the procedure of Example 1. The composition of the initial charge to the reaction vessel was: 2-methyl pentamethylene diamine 6.5 g (0.056 moles), adiponitrile 60 (0.556 moles), hexamethylene diamine (0.0026 moles), water 40 mL and 1.7 mL of 10% hypophosphorous acid (0.0026 moles).

The polymer obtained had an IV of 1.58 and an RV of 26.3. The polymer had a melting point of 251° C., heat of fusion of 45.0 J/g and thermal decomposition temperature of 396.6° C. No residual nitrile absorption was observed on IR analysis.

66/D,6 (20 mole % D,6)

A copolymer of 66/D,6 containing 20 mole % D,6 was prepared using the procedure of Example I. The composition of the initial charge to the reaction vessel was: 2-methyl pentamethylene diamine 13 g (0.112 moles), adiponitrile 60 g (0.556 moles), hexamethylene diamine 52 g (0.448 moles), water 40 mL and 1.7 mL of 10% hypophosphorous acid (0.0026 moles).

The polymer obtained had an IV of 1.47 and an RV of 21.3. The polymer had a melting point of 238.6° C. heat of fusion of 29.1 J/g and a thermal composition temperature of 380.1 ° C. No residual nitrile absorption was observed on IR analysis.

66/D,6 (50 mole % D,6)

A copolymer of 66/D,6 containing 50 mole % D,6 was prepared using the procedure of Example 1. The composition of the initial charge to the reaction vessel was 2-methyl pentamethylene diamine 32.5 g (0.280 moles), adiponitrile 60 g (0.556 moles), hexamethylene diamine 32.5 g (0.280 moles), water 40 mL and 1.7 mL of 10% hypophosphorous acid (0.0026 moles).

The polymer obtained had an IV of 1.35 and an RV of 13.0. The polymer had a melting point of 208.4° C., heat of fusion of 25.4 J/g and a thermal composition temperature of 386.3° C. There was a negligible amount of nitrile absorption from the polymer shown on IR analysis.

The melting point of polamides containing 2-methyl pentamethylene diamine, adiponitrile and hexamethyiene diamines at different polymer compositions of comparable molecular weight, are set out in Table 1 as follows.

TABLE 1

Melting Points of Polyamides Containing 2-Methyl Pentamethylene Diamine, Hexamethylene Diamine and Adiponitrile

| Polymer Composition | Melting Point (° C.) |
| --- | --- |
| 5% D6 | 258.9 |
| 10% D6 | 251.0 |
| 20% D6 | 238.6 |
| 50% D6 | 208.4 |
| 100% D6 | 178.9 |

EXAMPLE III

Preparation of a homopolymer of hexamethylene diamine and 2-methyl glutaronitrile A 100 mL reaction vessel equipped with an impeller agitator was charged with 27.4 g (0.245 moles) of anhydrous hexamethylene diamine, 25.1 g (0.232 moles) of 2-methyl glutaronitrile, 30 mL of water and 0.2 g of 50% hypophosphorous acid. The polymerization procedure of Example I was used.

The polymer obtained was a white, hard solid, 31.6 g in yield, with a relative viscosity (RV) of 3.80 (relative viscosity was measured in an 8.4% solution of formic acid). The polymer had a melting point of 175.2° C., and a heat of fusion of 40.3 J/g.

EXAMPLE IV

Preparation of a homopolymer of hexamethylene diamine and 2-methyl glutaric acid This comparative example illustrates the preparation of a homopolymer corresponding to that prepared and described in Example III above. This homopolymer was made using an aliphatic diamine and a diacid as the monomer reactants in the conventional "salt-strike" method.

The homopolymer of hexamethylene diamine and 2-methyl glutaric acid was prepared by open vessel polymerization. The apparatus consisted of a round bottom flask equipped with a jacketed Vigreaux reflux column, a mechanical stirrer and a distillation head with a Liebig take-off condenser. The condenser was fitted with a graduated fraction cutter and a distillate receiver. The apparatus was connected to nitrogen to permit purging. The polymerization flask was heated by an electrically heated mantle.

Aqueous hexamethylene diamine (115.6 g of 78.2 wt %, 0.807 moles). 2 methyl glutaric acid (114.2 g. 0.762 moles, obtained from Aldrich Chemical Co. MI.), 134.8 mL of water and 0.01 g of sodium hypophosphite were placed in the flask, and the flask was purged free of oxygen. With cold water in the Vigreaux column jacket, the flask was heated to 190° C. while being stirred. Over a period of about three hours, the amount of water generated by the condensation reaction and collected in the fraction cutter was approximately the theoretical amount for the complete reaction. The temperature was then raised to 21 0° C. and the heating was continued for another hour.

The polymer obtained was a white, hard solid, 170.9 g in yield, with a relative viscosity (RV) of 4.1 (relative viscosity was measured in an 8.4% solution in formic acid). The polymer had a melting point of 174.2° C., and a heat of fusion of 38.9 J/g.

A comparison of the properties of the polyamide formed from hexamethylene diamine and 2-methyl glutaronitrile using the process of the present invention, as set out Example III, versus the polyamide formed from hexamethylene diamine and 2-methyl glutaric acid using the conventional salt-strike method, as set out in this example (Example IV) indicates that the two polyamides are substantially the same as set out in Table II below.

TABLE II

A Comparison of Branched Polyamides made Using the Present Process Versus the Conventional Salt-Strike Process

| Property | Process of the Invention (a) | Salt-Strike Process (b) |
| --- | --- | --- |
| MP (° C.) | 175.2 | 174.2 |
| Heat of Fusion (J/g) | 40.3 | 38.9 |
| Amine Ends (ppm Equiv.) | 494.3 | 400.2 |
| Carboxyl Ends (ppm Equiv.) | 87.3 | 65.8 |
| Relative Viscosity | 3.8 | 4.1 |

(a) Homopolymer of hexamethylene diamine and 2-methyl glutaronitrile was prepared by this process as set out in Example III.
(b) Homopolymer of hexamethylene diamine and 2-methyl glutaric acid was prepared by this process as set out in Example IV.

We claim:

1. A process for the manufacture of a branched aliphatic polyamide comprising the steps of:
  (a) feeding an admixture of aliphatic dinitrile, aliphatic diamine and water to a reactor, wherein the amount of water is at least the stoichiometric amount required to convert the dinitrile and diamine to polyamide and wherein at least one of said dinitrile and said diamine is branched;
  (b) heating the admixture in the reactor to a temperature of at least about 270° C. under a pressure of at least about 1.2 MPa in the presence of a catalyst with the incremental addition of water;
  (c) venting water, ammonia and other volatile matter from the reactor while maintaining said temperature and pressure for a period of time of at least about 30 minutes;
  (d) maintaining said temperature for a further period of time while reducing the pressure in the reactor to at least atmospheric pressure; and
  (e) discharging the polyamide so formed from the reactor.

2. The process of claim 1, wherein the pressure is reduced to less than atmospheric pressure while the temperature is maintained for a further period of time in order to increase the molecular weight of the polyamide being formed.

3. The process of claim 2, wherein the further period of time is at least about 10 minutes.

4. The process of claim 3, wherein the further period of time is at least about 20 minutes.

5. The process of claim 1, wherein at least one compound selected from the group consisting of an aliphatic dicarboxylic acid, a lactam, an alpha, omega aminocarboxylic acid, an alpha, omega amino nitrile, an alpha, omega alkylene dinitrile and a second aliphatic diamine, is additionally fed to the reactor.

6. The process of claim 5, wherein the second aliphatic diamine is hexamethylene diamine.

7. The process of claim 1, wherein substantially stoichiometric ratios of dinitrile and diamine are used in step (a).

8. The process of claim 1, wherein a stoichiometric excess of water is added to the reactor in step (a).

9. The process of claim 1, wherein the dinitrile and diamine fed to the reactor each have six carbon atoms.

10. The process of claim 1, wherein said catalyst is a phosphorous-containing compound.

11. The process of claim 10, wherein said catalyst is selected from the group comprising phosphinic acid and/or the sodium or potassium salts thereof, hypophosphorous acid, sodium hypophosphite and phosphoric acid.

12. The process of claim 1, wherein the amount of catalyst to be added to the admixture ranges from about 0.05–2% by weight.

13. A process as defined in claim 1, additionally comprising the steps of melt extruding pellets of the polyamide so formed at a temperature of at least about 20° C. higher than the melting point of the polyamide, extruding the polyamide through a flat film die, and quenching the polyamide extrudate at a temperature of about 50° C. to form a film.

* * * * *